(12) United States Patent
Phillips et al.

(10) Patent No.: US 7,943,098 B2
(45) Date of Patent: May 17, 2011

(54) APPARATUS FOR GENERATING OZONE AND/OR $O_1$ USING A HIGH ENERGY PLASMA DISCHARGE

(75) Inventors: Stanley Phillips, Courtice (CA); Shirley Phillips, Courtice (CA); Andrew Phillips, Courtice (CA)

(73) Assignee: Ontario Inc., 1756940 Courtice, Ontario (CA)

( * ) Notice: Subject to any disclaimer, the term of this patent is extended or adjusted under 35 U.S.C. 154(b) by 1250 days.

(21) Appl. No.: 10/589,148

(22) PCT Filed: Mar. 3, 2005

(86) PCT No.: PCT/CA2005/000340
§ 371 (c)(1),
(2), (4) Date: Aug. 11, 2006

(87) PCT Pub. No.: WO2005/087658
PCT Pub. Date: Sep. 22, 2005

(65) Prior Publication Data
US 2007/0170123 A1   Jul. 26, 2007

(30) Foreign Application Priority Data
Mar. 16, 2004   (CA) .................................... 2461223

(51) Int. Cl.
*B01J 19/08* (2006.01)
(52) U.S. Cl. ............ 422/186.07; 422/186.16; 422/186.2
(58) Field of Classification Search ............. 422/186.07, 422/186.16, 186.2
See application file for complete search history.

(56) References Cited

U.S. PATENT DOCUMENTS

| | | | |
|---|---|---|---|
| 3,899,685 A | 8/1975 | Francis et al. | |
| 4,682,266 A | 7/1987 | Huynh et al. | |
| 4,790,980 A * | 12/1988 | Erni et al. | 422/186.15 |
| 4,877,588 A | 10/1989 | Ditzler et al. | |
| 5,154,895 A | 10/1992 | Moon | |
| 5,409,673 A | 4/1995 | Mausgrover et al. | |
| 5,411,713 A * | 5/1995 | Iwanaga | 422/186.15 |
| 5,492,657 A * | 2/1996 | Danschikov et al. | 264/83 |
| 5,529,760 A * | 6/1996 | Burris | 422/186.07 |
| 5,554,345 A * | 9/1996 | Kitchenman | 422/186.15 |
| 5,879,641 A | 3/1999 | Conrad et al. | |
| 5,892,675 A | 4/1999 | Yatsu et al. | |
| 5,945,072 A * | 8/1999 | Terada et al. | 422/186.07 |

(Continued)

FOREIGN PATENT DOCUMENTS
CA   989349   5/1976

(Continued)

*Primary Examiner* — Kishor Mayekar
(74) *Attorney, Agent, or Firm* — Riches, McKenzie & Herbert LLP

(57) ABSTRACT

An electro chemical conversion cell that can break down certain gasses to provide ozone and monovalent oxygen from a supplied volume of a suitable 02-containing gas. The conversion cell is provided with at least one metal mesh electrode within a generator reaction chamber, and a power supply which is adapted to supply a high alternating electric current voltage to at least partially break-down $O_2$ in the input gas to yield ozone. A fluid flow passage extends through the reaction chamber as a generally elongated passage through the reaction cavity. The fluid flow passage extends from an upstream end, where the $O_2$-containing gas is initially supplied into the housing, to a downstream end where treated gas either flows outwardly therefrom under pressure or is evacuated from the housing. In a simplified construction, the fluid flow passage is delineated by a series of electrically insulating plates and/or spacers which are used to partition the reaction cavity.

24 Claims, 5 Drawing Sheets

U.S. PATENT DOCUMENTS

| | | | |
|---|---|---|---|
| 6,146,599 A * | 11/2000 | Ruan et al. | 422/186.04 |
| 6,468,400 B2 | 10/2002 | Smith | |
| 2003/0141180 A1 | 7/2003 | Conrad et al. | |

FOREIGN PATENT DOCUMENTS

| | | |
|---|---|---|
| CA | 2129848 | 8/1993 |
| CA | 2075789 | 2/1994 |
| CA | 2163820 | 6/1996 |
| CA | 2224163 | 12/1996 |
| CA | 2291525 | 6/2001 |
| CA | 2424410 | 10/2004 |
| JP | 01153502 A | 6/1989 |
| JP | 11157809 A | 6/1999 |
| JP | 11322305 A | 11/1999 |
| WO | WO 97/01507 | 1/1997 |

* cited by examiner

Figure 6a
Figure 6b
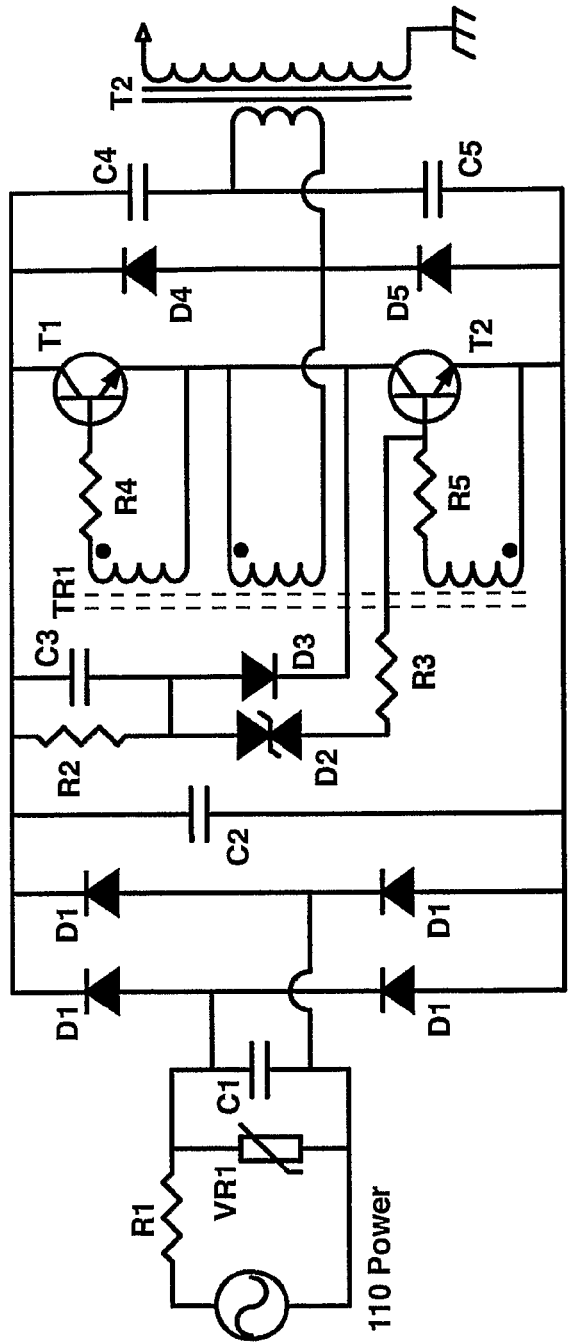
Figure 7

APPARATUS FOR GENERATING OZONE AND/OR $O_1$ USING A HIGH ENERGY PLASMA DISCHARGE

This application is a 35 U.S.C. National Stage filing of PCT/CA/05/00340 filed Mar. 3, 2005.

SCOPE OF THE INVENTION

The present invention relates to an apparatus for use in generating ozone, and more preferably an apparatus having an electrochemical conversion chamber for receiving a suitable $O_2$-containing gas. The apparatus operates ozone by supplying an alternating current voltage to one or more mesh electrodes disposed in the electrochemical conversion chamber to effect conversion of $O_2$ to ozone, and more preferably ozone and at least some monovalent oxygen.

BACKGROUND OF THE INVENTION

The use of ozone gas in water purification is well known. Typically, the ozone acts as an oxidant to treat both organic and inorganic substances to provide disinfection of potable water.

Various ozone generation systems are known for treating oxygen containing gases to break down the oxygen and generate ozone. Typically with conventional systems, a suitable oxygen containing gas, such as air, is exposed to an electrode which is positioned within a reactor. The electrode is then subjected to a high voltage alternating or pulsed direct current discharge. As a result, the current applied to the electrode produces a plasma or corona discharge which breaks down the molecular bonds $O_2$ and provides the desired ozone gas production. U.S. Pat. No. 6,488,819 B2 to Conrad et al discloses a conventional apparatus for use in ozone production. In Conrad et al, a high voltage spiral electrode is provided in a reaction chamber into which an $O_2$-containing gas or vapour is passed. Circuitry consisting of high and low voltage transformers, rectifiers and transistors is then used to provide an alternating direct current to the electrode, to effect the required coronal discharge.

Although prior art systems have proven operable in producing limited quantities of ozone from introduced gases, prior art systems have proven electrically inefficient. As a result of high volume demands, the industry is looking for smaller and increasingly efficient ozone generator constructions which maximize ozone gas and $O_1$ output while minimizing energy requirements.

SUMMARY OF THE INVENTION

The present invention seeks to overcome at least some of the disadvantages of prior art ozone generation systems by providing a comparatively electrically efficient ozone generator for producing ozone and/or $O_1$ from a supplied volume of a suitable $O_2$-containing gas. The generator is preferably provided with at least one metal mesh electrode within a generator reaction chamber, and a power supply which is adapted to supply a high alternating electric current voltage to at least partially break-down $O_2$ in the input gas to yield ozone.

Another object of the invention is to provide a comparably compact ozone and/or $O_1$ generator which exhibits improved energy efficiency as compared to conventional ozone generation apparatus, providing enhanced effectiveness at either lower or conventional power levels.

A further object of the invention is to provide an apparatus for generating ozone which is adapted to produce ozone gas from a volume of input gas to be treated, either as part of a continuous input gas flow, or as part of a batch process, and which more preferably is also adapted to produce as an advantageous bi-product of ozone gas production.

Another object of the invention is to provide a simplified and easily assembled ozone generator apparatus which may be used in air and/or water purification systems, medical equipment sterilization systems, waste treatment systems, or other systems where ozone gas production is desired.

To at least partially achieve some of the foregoing objects, the present invention provides an ozone generating apparatus which includes a housing having a gas reaction chamber or cavity therein. A fluid flow passage extends through the reaction chamber, and along which is introduced a gas or vapour to be treated, and most preferably an $O_2$-containing gas. One or more electrodes which are electrically connected to a power source are provided within the fluid flow passage. The electrodes may, for example, be of a conventional design, however, for increased efficiency are formed from a metal mesh or other multipoint source, and more preferably a metal mesh sheet, such as stainless steel mesh, platinum mesh or other inert metal mesh which has been folded in an overlapping or accordion-like manner. The power source is adapted to supply either pulsed direct current voltage or an alternating current (AC) voltage to the electrodes, to produce a corona discharge in the fluid flow passage which is used to convert the oxygen to ozone. Preferably the voltage is supplied to effect a corona discharge which produces not only ozone, but also at least a quantity of some monovalent oxygen.

In an optimum construction, the fluid flow passage is formed as a generally elongated passage through the reaction cavity. The fluid flow passage extends from an upstream end, where the $O_2$-containing gas is initially supplied into the housing, to a downstream end where treated gas either flows outwardly therefrom under pressure or is evacuated from the housing. To minimize space, the fluid flow passage may be provided as a generally serpentinely extending passage which includes two or more non-linearly extending passage segments. In a simplified construction, the fluid flow passage and passage segments are delineated by a series of electrically insulating plates and/or spacers which are used to partition the reaction cavity. Although not essential, one or more mesh electrodes and/or multipoint electrodes are disposed in each passage segment for reacting with the introduced gas as it moves therethrough.

A cooling apparatus may further be used to assist in maintaining the reaction chamber at an optimum reaction temperature. Suitable cooling apparatus could, for example, include the mounting of thermally conductive heat sinks or fins on part of the housing exterior surface, external cooling fans, a cooling bath, and/or a refrigerated cooling fluid system for providing a cooling fluid such as water or Freon gas in thermal contact with the housing.

In a preferred construction, the electrodes and/or multipoint sources are provided with a longitudinal length which is less than the length of each flow passage segment, thus providing the fluid flow passage with sections where either reduced or no plasma or coronal discharge occurs. Where thermally conductive insulating plates and spacers are used to delineate the fluid flow passage, such as those made of ceramics, the areas where no corona is generated advantageously permit partial cooling of the oxygen containing gas during the operation of the apparatus. This has been found to achieve increased operating efficiency for the reaction process, and the output of greater concentrations of ozone and/or monovalent oxygen may be achieved.

Most preferably, power is supplied to the electrodes in either a generally square sinuous waveform at a frequency of about 4 kHz, and a wattage of between about 50 and 250 watts. In an alternate embodiment, it is envisioned that power may be supplied to the electrodes in a square sinuous waveform which includes a comparatively short high positive square wave pulse, followed by a pause and then a comparatively short negative square wave pulse as a mode of increasing the peak power that produces ozone and/or $O_1$ and reducing overall energy demands. Other power supply waveforms may, however, also be used.

Accordingly, in one aspect the present invention resides in an apparatus for generating ozone and/or monovalent oxygen by the chemical conversion of an input gas comprising a housing defining a cavity therein, a fluid flow passage disposed in said cavity, said fluid flow passage being electrically insulated from said housing, at least one electrode disposed in said fluid flow passage, said electrode comprising a sheet of metal mesh or a multipoint electrode source, a power source for supplying an AC voltage, said power source including a contact lead electrically coupled to each said at least one electrode, and a ground lead in electrical contact with ground, a gas inlet extending through said housing and providing gaseous fluid communication with a first portion of said flow passage upstream from said electrode, a gas outlet passage extending through said housing and providing gaseous fluid communication with a second portion of said flow passage spaced downstream from said electrode.

In another aspect the present invention resides in an apparatus for producing ozone and monovalent oxygen a metal housing defining a cavity therein, a fluid flow passage disposed in said cavity, said fluid flow passage being electrically insulated from said housing, a plurality of electrodes disposed in said fluid flow passage and being spaced in a direction of said flow passage from each other, said electrodes comprising a sheet of metal mesh or multipoint source, a generator element for producing a pulsed AC voltage including an electrical contact electrically coupled to each of said electrodes, and a ground electrode physically separated from said electrodes to form a gap therebetween, a fluid inlet extending through said housing and providing gaseous fluid communication with an upstream end portion of said flow passage, a fluid outlet passage extending through said housing and providing gaseous fluid communication with a downstream end portion of said flow passage spaced flow, a fluid supply for supplying a fluid through said fluid inlet into said fluid passage and outwardly therefrom through said fluid outlet.

In a further aspect the present invention resides in an apparatus for generating ozone comprising a metal housing defining a cavity therein, a generally serpentinely extending fluid flow passage disposed in said cavity, said fluid flow passage being electrically insulated from said housing and comprising a plurality of passage segments, a metal mesh electrode selected from the group consisting of stainless steel mesh and platinum mesh disposed in each of said passage segments, a power source for supplying a pulsed voltage including a lead wire electrically coupled to each said at least one electrode, and a ground wire in electrical contact with said housing, a fluid inlet extending through said housing and providing gaseous fluid communication with a first portion of said flow passage upstream from said electrodes, a fluid outlet passage extending through said housing and providing gaseous fluid communication with a second portion of said flow passage spaced downstream from said electrodes, a fluid pump for supplying a fluid flow along said fluid flow passage from said fluid inlet to said fluid outlet.

BRIEF DESCRIPTION OF THE DRAWINGS

Reference is now made to the following detailed description taken together with the accompanying drawings in which:

FIGS. 6a and 6b illustrate schematically preferred electrical waveforms used in the ozone generator of FIG. 1; and FIG. 7 represents a preferred circuit diagram for use in a power supply to generate the electrical waveforms shown in FIGS. 6a and 6b.

DETAILED DESCRIPTION OF THE PREFERRED EMBODIMENTS

Figure 1:
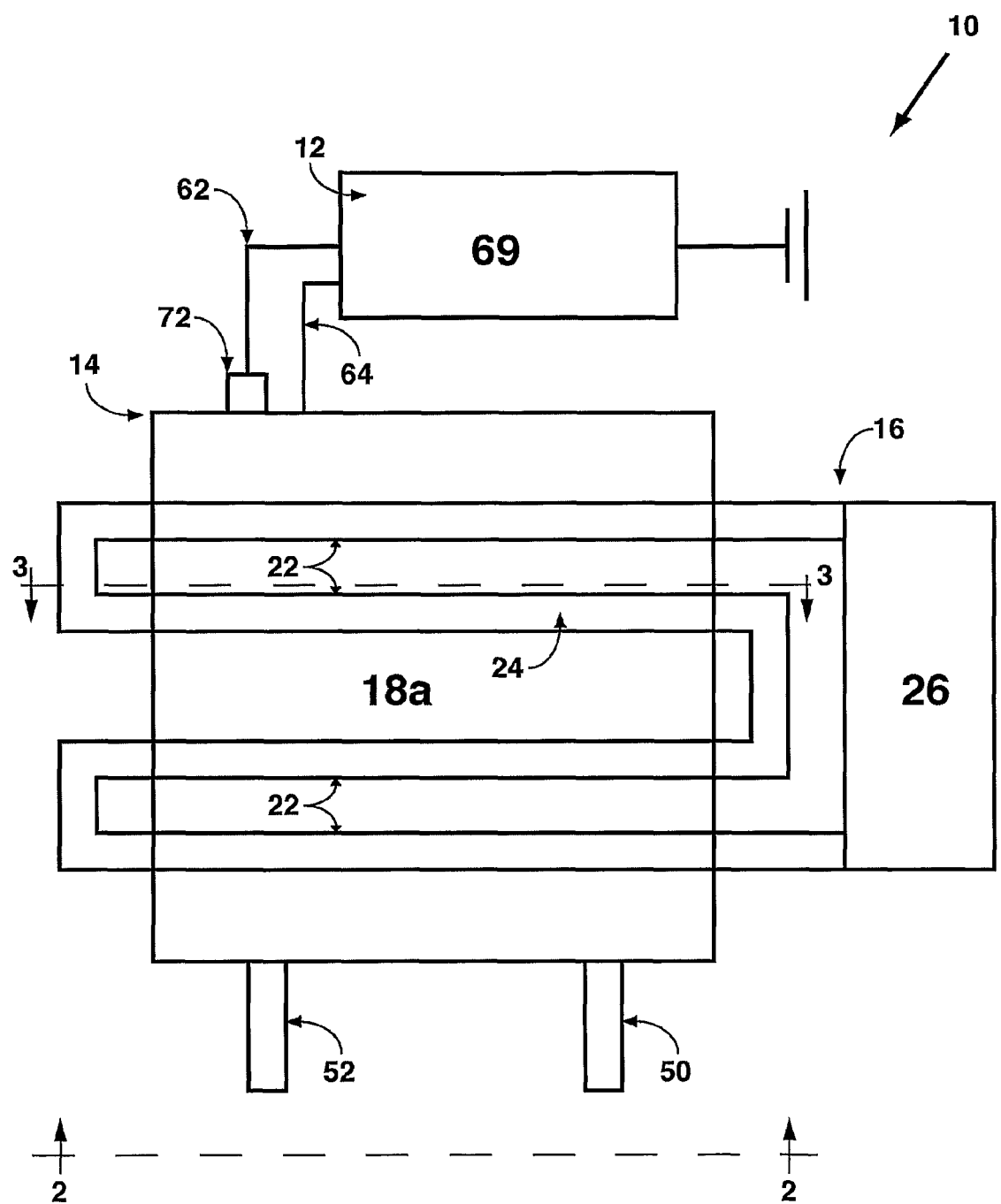
FIG. 1 illustrates schematically a perspective view of an ozone generator in accordance with a preferred embodiment of the invention.

Reference is first made to FIG. 1 which illustrates an ozone generator 10 in accordance with a preferred embodiment of the invention, and in which a suitable oxygen containing gas, such as air, is introduced and subjected to a coronal discharge to convert the $O_2$ to ozone, and most preferably ozone and at least some monovalent oxygen. The generator 10 includes an alternating current power supply 12, a housing 14 and a liquid cooling system 16.

As shown best in FIGS. 2 to 5, the housing 14 consists of a square upper aluminum cover member 18a and square aluminum bottom cover member 18b which in an assembled construction have a length and width selected at between about 12 and 25 cm. The bottom cover member 18b further has integrally formed therewith a peripherally extending sidewall 19 which extends upwardly from a remainder of the cover member 18b a distance selected at between about 0.5 and 2 cm. As shown best in FIG. 4, the upper cover member 18a is adapted for mated engagement against the upper edge of the sidewall 19 so as to define an interior electrochemical conversion or reaction cavity 20 (FIGS. 2 and 3) when coupled thereto.

As shown in FIG. 1, a series of grooves 22 are formed at parallel spaced locations across the exterior of each of the cover members 18a, 18b. The grooves 22 are sized to receive at least partially recessed therein a copper tube 24 which is provided as part of the cooling system 16. The cooling system 16 further includes a refrigerant pump 26 which is in fluid communication with each end of the cooling tube 24. The tube 24 is wound about at least part of the housing 14 such that the operation of the pump 26 circulates a suitable cooling fluid, such as water, through the tube 24. Because the tube 24 is formed from a thermally conductive material, it is effective in conducting heat away from the housing 14. In a most preferred construction, the cooling apparatus 16 is adapted to cool the exterior surface of the housing 14 at locations where contacted by the tube 24 to a temperature less than 15° C., preferably between about 0 and 12° C., and more preferably between about 5 and 10° C. It is to be appreciated, however, that depending on the specific operating conditions, temperature is specifically adjustable to provide the greatest efficiency balancing power required for coding against the power necessary for ozone and/or $O_1$ generation.

Figure 2:
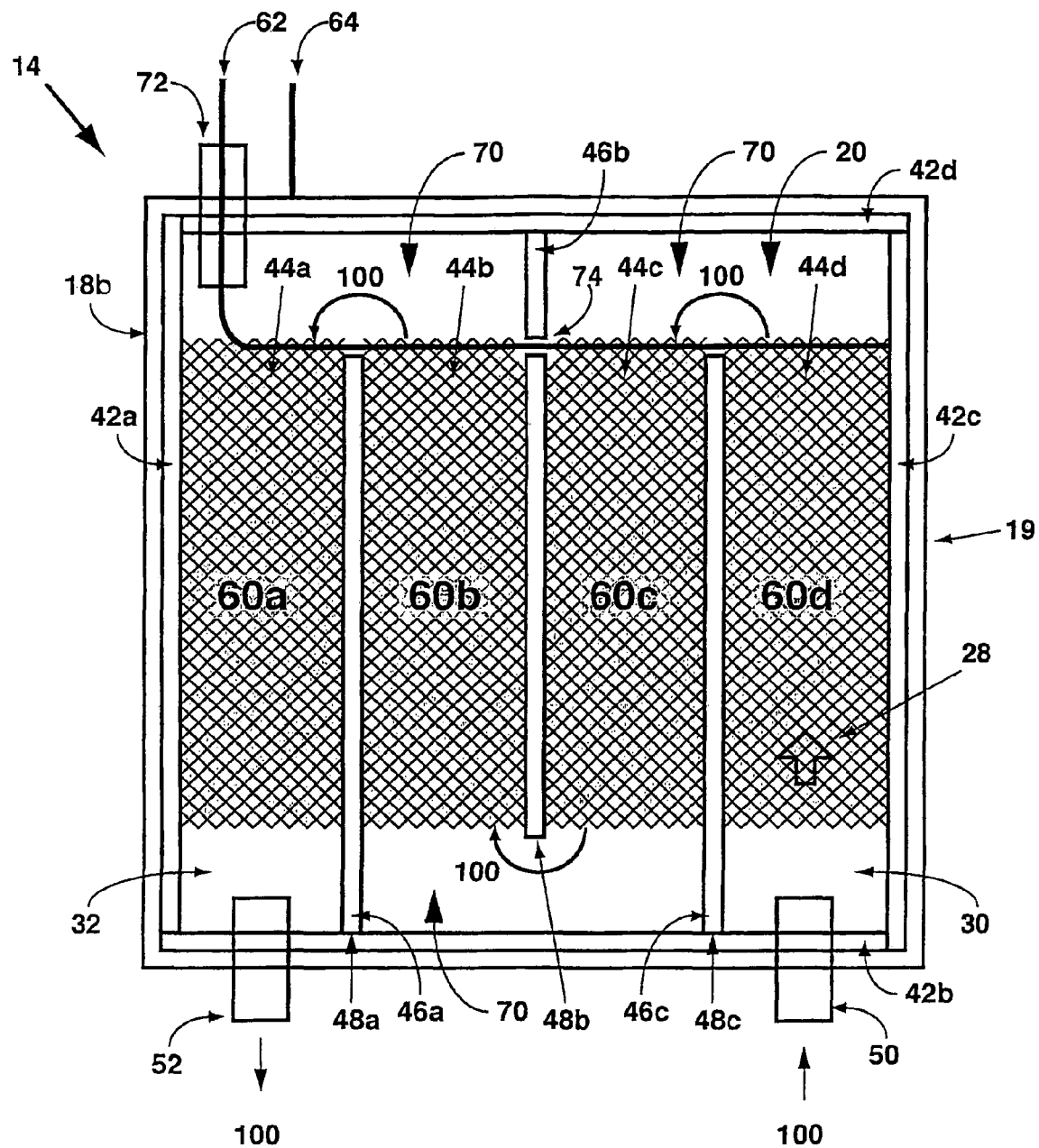
FIG. 2 illustrates a sectional view of the ozone generator housing shown in FIG. 1 taken along lines 2-2 with the upper cover member removed.
Figure 3:
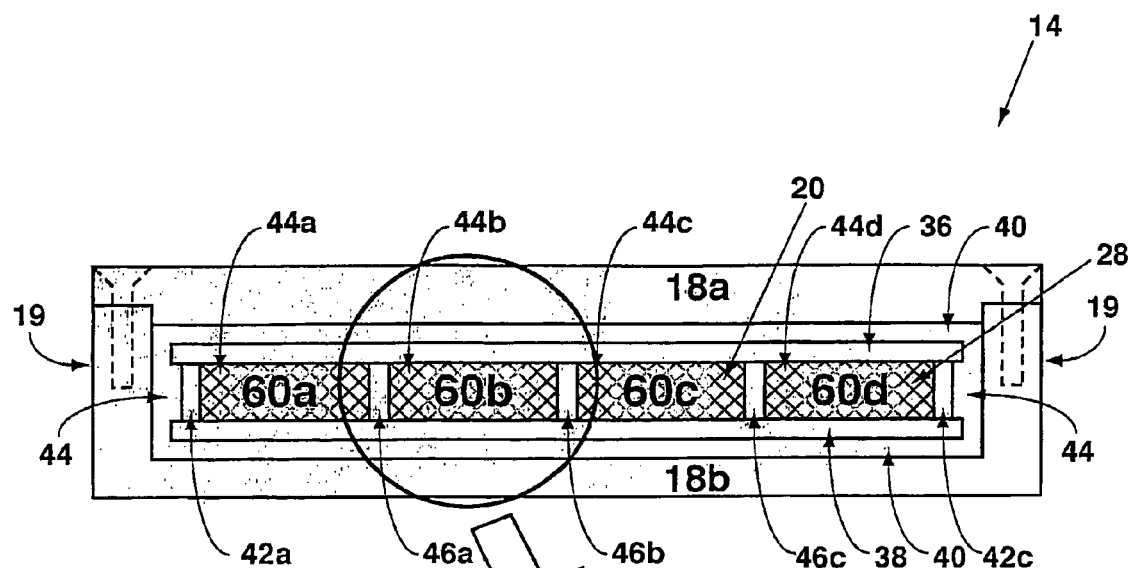
FIG. 3 illustrates a cross-sectional view of the ozone generator housing shown in FIG. 1 taken along line 3-3.
Figure 4:
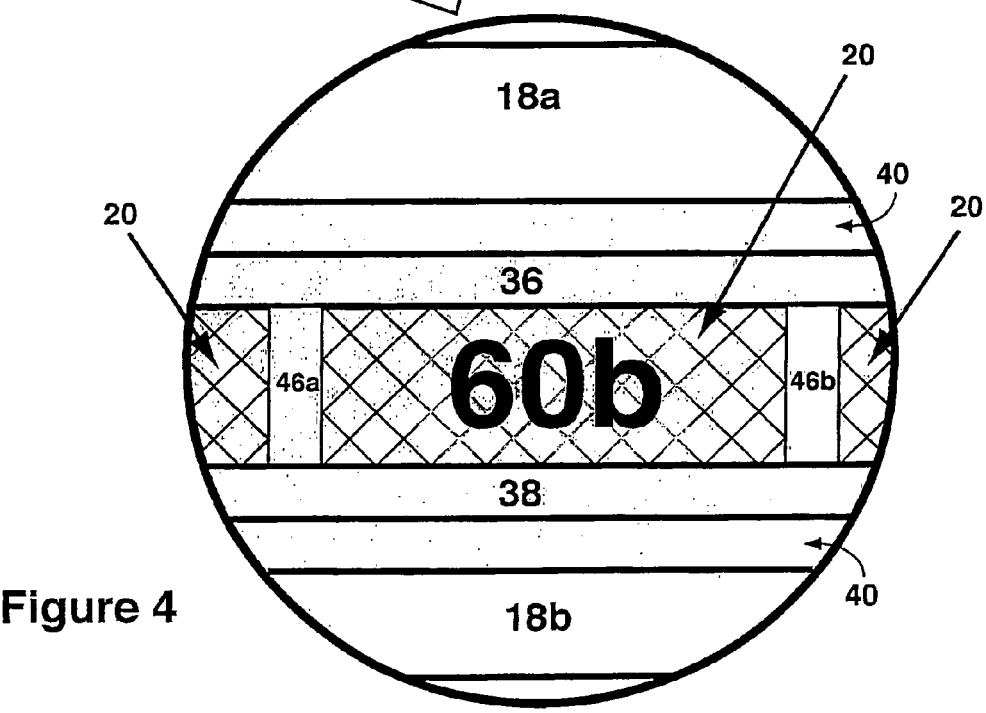
FIG. 4 is an enlarged cross-sectional view of Section IV shown in FIG. 3 illustrating an electrode.
Figure 5:
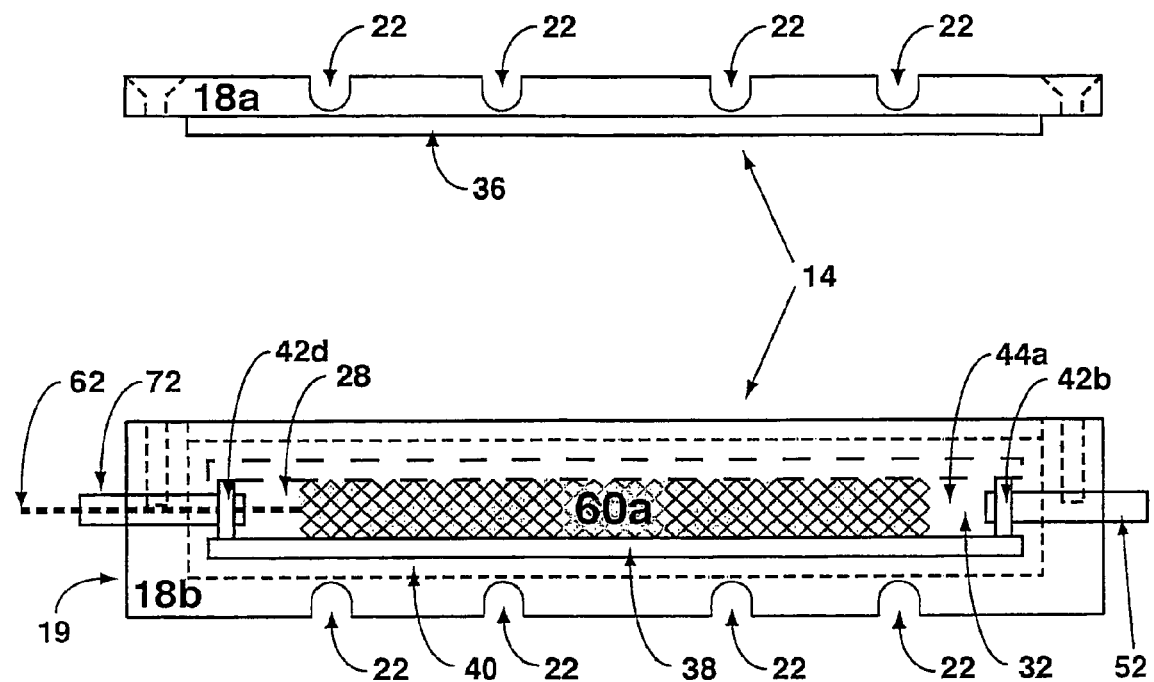
FIG. 5 illustrates a partial exploded side view of the housing illustrating the placement of the cover panel thereon.

FIGS. 2 and 3 show best the interior reaction cavity 20 which acts as a reaction vessel for the decomposition of oxygen into ozone and monovalent oxygen. A serpentinely extending gas flow passage 28 extends through the cavity 20 from an upstream gas inlet end portion 30 to a downstream gas outlet end portion 32. The gas flow passage 28 is defined at its upper and lower sides by a pair of identical, generally square ceramic plates 36,38. The plates 36,38 are sized marginally smaller than the inner diameter of the sidewall 19, so as to fit snugly with the cavity 20. Preferably, the ceramic plates 36,38 are secured to a respective cover member 18a, 18b by a magnesium dioxide coating 40 (FIG. 3) so as to directly align with one another when the upper cover 18a is secured in position to the sidewall 19, however, other coatings which provide high thermal conductive and electrical resistively may also be used.

FIG. 2 shows best the lateral most edges of the flow passage 28 similarly formed by [either three, or optionally four] elongated rectangular ceramic spacer plates 42a,42b,42c,42d. The spacer plate 42a,42b,42c,42d extend longitudinally a marginal distance less than the length of the ceramic plates 36,38, and each have a lateral width selected to extend snugly vertically between the plate 36,38 when the cover member 18a is bolted to cover member 18b in the sealed manner shown in FIG. 3.

The interior of the fluid flow passage 38 is divided into four separate passage segments 44a,44b,44c,44d (FIG. 2) by positioning three ceramic interior plate 46a,46b,46c in a generally parallel equally spaced arrangement between spacer plate 42a and 42c. Each of the ceramic interior plate 46a,46b,46c has a longitudinal length selected less than the length of the ceramic plate 36,38, and more preferably selected at between about ⅔ to ¾ the length of the ceramic plate 36,38.

During testing optimum, performance was found with the spacer plates 42a,42b,42c,42d having a lateral width selected at between about 0.5 cm and 2 cm, however, depending on the size of the generations unit, spacing may vary. The spacer plates 42a,42b,42c,42d thus assist in maintaining the square plate 36,38 in the desired spaced relationship and define the upper and lower outer extent of the flow passage 28. A layer of silicone 44 is provided between the sidewall 19 each respective spacer plates 42a,42b,42c,42d to better electrically insulate the fluid flow passage 28 from the housing 14. In a further embodiment, the spacer plate 42a,42b,42c can be manufactured into one or both of the ceramic plate 36,38.

FIG. 2 shows best the interior plate 46a,46c as being positioned with one respective adjacent end 48a,48c in substantially sealing contact with the spacer plate 42b. The interior plate 46b is positioned in a longitudinally offset orientation relative to the spacer plates 46a,46c with its adjacent end 48b located a distance from the spacer plate 42b and in abutting contact with spacer plate 42d, so as to permit substantially unhindered gas flow therebetween. The peripherally extending ceramic spacer plate 42a,42b,42c,42d most preferably have substantially the identical lateral width as the interior spacers 46a,46b,46c, so as to locate in substantially gas sealing contact with each of the square plate 36,38 in assembly of the housing 14.

FIG. 2 shows best a gas inlet tube 50 extending through the housing sidewall 19 and permitting gas flow into the upstream gas inlet end portion 30 of the fluid flow passage 28. A gas outlet tube 52 is provided through the sidewall 19 in fluid communication with the other downstream end portion 32 of the fluid flow passage 28 and which permits the flow and/or evacuation of ozone, any monovalent oxygen and other reacted gases outwardly from the reaction cavity 20.

FIG. 2 shows best four stainless steel wire mesh/multipoint electrodes 60a,60b,60c,60d as being positioned along the fluid flow passage 28. The applicant has appreciated that the mesh construction of the electrodes 60 advantageously provides increased contact area with the gas as it flows along the passage 28 and further facilitates turbulence in the gas flow, facilitating its mixing. Each electrode 60a,60b,60c,60d is positioned in a centrally disposed region of a respective flow passage segment 44a,44b,44c,44d. The mesh electrodes 60 are each formed in a substantially identical manner from a single piece of stainless steel mesh. As shown best in FIG. 4, preferably, the mesh is selected as a number 7 per mm size mesh and is folded in an accordion-like manner, with the result that each electrode 60 includes at least three and more, and preferably between five and nine juxtaposed metal layers. The electrodes 60a,60b,60c,60d are provided with a thickness of between about 0.4 and 0.6 mm, and more preferably a thickness selected to substantially span between the ceramic plate 36,38. As shown best in FIG. 3, the electrodes 60a,60b, 60c,60d have a lateral width selected so as to extend laterally substantially across each associated flow passage segment 44a,44b,44c,44d, ensuring that gas flowing from the inlet tube 50 to the outlet tube 52 along the fluid flow passage 28 filly passes through each electrode 60.

FIG. 2 shows best the electrodes 60a,60b,60c,60d as extending in a longitudinal direction approximately half the longitudinal length of each associated flow passage segment 44a,44b,44c,44d. The electrodes 60a,60b,60c,60d are positioned in a central portion of each respective flow passage 44a,44b,44c,44d so as to define at each end thereof coronal discharge free areas 70. The inclusion of various discharge free areas 70 in the fluid flow passage 28 permits partial cooling of the treated gas during the reaction process. With the present construction, the use of ceramic plate 36,38 and ceramic spacers 42,46 further provide enhanced thermal conductivity from the flow passage 28 and housing 14. The partial cooling of the gas has been found to enhance the breakdown of $O_2$, yielding increased quantities of ozone as well as monovalent oxygen.

FIGS. 1 and 2 shows best the power supply 12 as including an electric lead wire 62 and an electric ground wire 64. As will be described, the lead wire 62 is coupled to an output power source 69 of the power supply 12, and extends into an interior of the housing 14 to supply electrical current to the electrodes 60 during operation. The ground wire 64 is most preferably electrically connected to the exterior of the housing 14 and/or another suitable ground, with the electrodes 60a,60b,60c,60d each connected in series along one end portion by the electric lead wire 62. The electric lead wire 62 is inserted through an opening formed in the housing sidewall 19, and is maintained electrically insulated therefrom by means of a hollow tubular ceramic insert 72. Although not essential, for increased operating efficiency, the lead wire 62 is made as short as possible and is fed through a bore hole 74 drilled in the ceramic plate 46b. The bore hole 74 is sealed about the wire 62 with Silicon™, or other suitable sealant that has a high insulation factor and resistance to oxidation to prevent substantial volumes of gas from flowing therethrough.

The power source 69 could, for example, be constructed with circuitry in a similar manner to that described in U.S. Pat. No. 6,488,819 B2 to Conrad et al. While a suitable voltage waveform may be achieved by the circuitry disclosed in U.S. Pat. No. 6,488,819 to Conrad et al, more preferably, the power source circuitry is modified to provide power to the electrodes 60 in a high voltage square waveform as shown in FIGS. 6a and 6b.

FIG. 7 illustrates schematically a circuit diagram for a more preferred power source 69 in accordance with the present invention. The power source circuitry preferably includes the following components or their equivalent:

| | |
|---|---|
| 1 | Heat sink for T1 & T2. This will normally be the case of the water cooled generator |
| 1 | 8 pin DIP socket. (For TR1 Transformer) |
| D1 (4 off) | 10 Amp 600 Volt bridge rectifier (single bridge or 4 separate rectifiers) |
| D2 | 32 Volt Diac - NTE 6408 (or equivalent) |
| D4, D5 | 11DF4 International Rectifier. High Speed Diode. |
| T1, T2 | Transistor. MJE 1305, BUL 146 |
| R1 | 0.47 Ohm 5 Watt resistor |
| R2 | 22ik 0.5 Watt resistor |
| R3 | 68 Ohm 0.25 Watt resistor |
| R4, R5 | 1.6 Ohm 0.5 Watt resistor |
| C1 | 0.1 MFD 250 V AC or 1000 VDC working |
| C3 | 0.01 MFD Ceramic capacitor |
| C2 | 220 MFD 400 VW High Ripple current electrolytic capacitor. OR: 0.1 MFD Ceramic with very low <2 Gm (Oxygen) Ozone units. |
| C4, C5 | 0.33 MFD 400 VW Metalized Mylar/Poly capacitor. High ripple current rating |
| VR1 | 120 Voltage transient suppressor |

Transformer cores and Toroid.
2 Ferrite cores
1 Ferrite Toroid Core.

The HV transformer is preferably mounted about 3 cm above any metal plate using insulating bolts or straps. The radiated field from the transformer can cause the plate to get hot and any energy lost can reduce the generator output.

FIG. 7 illustrates schematically a simple circuit using two transistors with transformer feedback used to obtain the waveform of FIG. 6a. The design in development is one using a computer/microprocessor ("embedded system).

The output of the circuit drives the ozone generator. While the input power supply is shown as 110 Volt AC, it can operate off other voltages by changing the number of turns on the primary of the output transformer, and ensuring that certain components have a suitable voltage rating.

The 110 Volt AC is rectified by the diode bridge rectifier D1 and charges capacitor C1 to about 160 Volts DC. Resistor R1, and Capacitor C1 and Varactor VR1 work together to give some protection against voltage transients from the AC mains and limit RF interference.

When the circuit is first switched on, capacitor C2 charges to about 160 Volts. Transistors T1 and T2 are "turned off" as there is no positive voltage on the bases to turn them on. Components R2, C3, D2 and D3 form a circuit that will start the circuit operating.

D2 is a Diac trigger diode and is operable to open the circuit until the voltage across it reaches a certain level. In a preferred constructions, diode D2 is selected to trigger at about 32 Volts.

As the DC voltage across C2 increases, the voltage at the junction of D2 and C3 also increases, as initially C3 has no charge. The other end of D1 is connected to the base of transistor T2 via resistor R3. As this voltage rises, voltage across D2 increases, until it reaches about 32 Volts, when it "turns on" and the voltage across it drops to a very low level. As this happens, Capacitor C3 charges up taking current through D2, R3 and the base emitter of Transistor T2, turning this transistor on. During normal operating conditions, Diode D3 keeps Capacitor C3 charged, and the voltage across the Trigger diode D2 below its trigger voltage. When the circuit is switched off, Resistor R2 discharges Capacitor C3.

With transistor T2 turned on, DC current passes through the transistor T2, through winding B of TR1, to the primary of the HV transformers. As the current increases through winding B, the phase of the other windings is such that the secondary C drives the base of T2 positive, keeping it turned on. At the same time, the secondary winding A drives the base T1 negative, keeping it turned off. Due to the inductive effect of the HV transformer, the current increases, generating a high voltage in the secondary that is connected to the Ozone generator. As the current keeps increasing, this increasing current also keeps the voltage on T2 positive and the voltage on the base of T1 negative. Eventually, the rate of current increase slows down due to the transformer core reaching saturation, and eventually starts to drop. (The voltage at the junction of C4 and C5 remains fairly constant). As this happens, the voltage on the secondaries of TR1 reverse, turning transistor T2 off and transistor T1 on. The current through transistor T1 now drives current in the reverse direction through the HV transformer with the process repeating itself.

As a result of the circuitry operation, the power supply 12 outputs energy in the generally square waveform shown in FIG. 6a, with peak power oscillating sharply between positive and negative polarities. The applicant has appreciated that by providing a power level with a peak power that oscillates between positive and negative polarity, and with substantially instantaneous power, achieves more highly efficient ozone production.

FIG. 6b shows an alternate envisioned waveform for energy supplied to the electrodes 60 in the use of the present invention. In FIG. 6b, power is again supplied to the lead wire 62 and electrodes 60a,60b,60c,60d by the power supply 12 with a comparatively higher positive and negative polarity. Power is supplied, however, for only part of the cycle, resulting in a lower average power output. In particular, high voltage AC waveform is applied to the wire mesh electrodes 60 so as to create an ionizing plasma between the ceramic plates and wire mesh. Following the initial powering of the electrodes 60, the power source 12 remains in a brief power-off cycle, followed thereafter by a substantially instantaneous negative polarity.

The applicant has appreciated that with the wave form shown in FIG. 6b, given average power level, the "peak power" is high, giving corona (U.V.) conditions that give better Ozone/$O_1$ conversion. Putting it another way, for a given power level, Ozone generation with this waveform will be higher than for a normal square wave; giving greater efficiency together with higher $O_1$ generation. As $O_1$ (monovalent Oxygen has approx ten times more Oxidizing capability than Ozone, this "power efficiency" is even higher than accounted for by watt/hours per gram of Ozone.

Thus, in addition to reducing overall power consumption, there is the greater capability of $O_1$ (monovalent Oxygen) production.

During normal operation of an Ozone generator, the gas enters the inlet end portion 30 a labyrinth flow passage 28 that has an electrode providing an ionized path along the length. As the gas passes along the passage 28, it gets hotter, and to some extent, the amount of Oxygen decreases as Ozone if produced. Ozone generated at the beginning of this labyrinth is also heated and due to this heat, is degrading all the way through, reducing the total output. Also, towards the end of the labyrinthine passage 28 there is less Oxygen to convert to Ozone. In an alternate "batch process", operation mode where the generator is operating and there is ozone along the labyrinth passage 28, power is switched off. Now there is Oxygen going into the generator and already converted Ozone coming out at the end. This state continues until nearly all the Ozone has come out and the generator almost full of Oxygen. A very high level of power (ionizing energy) is then reapplied for a very short period of time to convert all the Oxygen already inside the generator, after which power off again. Now as the Ozone is passing through the labyrinth, there is now no ionizing energy to degrade the Ozone/$O_1$. When the Ozone has passed through the labyrinth passage 28 and more oxygen has entered, switch the power back on etc. The length of time that the power is off, will depend on the gas flow and the "high power level" will be that needed to ionize the gas (Oxygen) to the desired level.

Ionization of the introduced gas starts at the edge of each multipoint electrode 60a,60b,60c,60d, with the electrodes 60a,60b,60c,60d substantially achieving ionizing over their entire surface. As the electrodes 60a,60b,60c,60d extend across each segment 444a,44b,44c,44d, the gas is forced through the electrodes 60, with the oxygen in the input gas being converted to ozone and monovalent oxygen.

Ultraviolet light produced during operation of the electrodes 60a,60b,60c,60d also assists in ionizing $O_2$ in the input gas, creating ozone and/or monovalent oxygen. It can also be used to ionize and break down other gases, such as CF3Br Simultaneously with the introduction of the gas into the reaction cavity 20, the power supply 12 is activated and the electric circuit is initialized to supply the power to the electric lead 62 and electrodes 60a,60b,60c.

Concurrently, the liquid cooling system 16 is activated to circulate refrigerant fluid through the cooling tube 24. The thermal contact between the tube 24 and cover members 18a, 18b, and their contact in turn with the ceramic plate 36,38 achieves cooling of the discharge free areas 70, to cool the gas moving therethrough.

Ionization of the introduced gas occurs along the entire length of each multipoint electrode. As the electrodes 60a, 60b,60c,60d extend across each segment 44a,44b,44c,44d, the gas is forced through the electrodes 60, with the oxygen contained in the input gas being converted to ozone and monovalent oxygen. Ultraviolet light produced during operation of the electrodes 60a,60b,60c,60d also assists in ionizing $O_2$ in the input gas, creating ozone and/or monovalent oxygen and breaking down other gases such as CF3Br.

As indicated, the applicant has appreciated that the physical construction of the mesh used in the electrode 60 construction assists in causing turbulence within the flow passage 28 and facilitates the mixing of the gases and more complete ozone and monovalent oxygen production. The power waveform provides comparatively short high level ionizing pulses, optimally followed by a pause and thereafter a negative square waveform pulse has been found to achieve rapid ionization.

Example 1

In prototype testing of the housing 14 and mesh 60 construction output was measured, albeit without water or other cooling fluid cooling, ozone concentration output for the processing of air was calculated on the basis of a continuous flow mode for input gas (litres per minute) as shown on the attached Table I:

TABLE I

OZONE GENERATOR

| PSI | FLOW Liters/ Min | Lab ref Only VOLTS | WATTS | G/M Concentrations in Grams per Cubic Meter | G/ HR | Comments |
|---|---|---|---|---|---|---|
| 5 | 5.5 | | 50 | 15.7 | 5.2 | |
| 5 | 5.5 | 82 | 100 | 30.9 | 10.2 | |
| 5 | 5.5 | 99 | 150 | 42.5 | 14.0 | |
| 5 | 5.5 | 116 | 200 | 52.0 | 17.2 | |
| 5 | 5.5 | 130 | 250 | 58.1 | 19.2 | |
| 9 | 5.5 | 81 | 100 | 33.2 | 11.0 | |
| 9 | 5.5 | 99 | 150 | 45.0 | 14.9 | |
| 9 | 5.5 | 116 | 200 | 54.7 | 18.1 | |
| 9 | 5.5 | 130 | 250 | 61.6 | 20.3 | |
| 9 | 2.75 | 116 | 200 | 80.4 | 13.3 | |
| 9 | 2.75 | 130 | 250 | 82.8 | 13.7 | |
| 15 | 2.75 | 116 | 200 | 84.0 | 13.9 | |
| 15 | 2.75 | 130 | 250 | 87.8 | 14.5 | |
| 13.5 | 9 | 116 | 200 | 42.3 | 22.8 | Cool for 20 MIN |
| 13.5 | 9 | 130 | 250 | 48.5 | 26.2 | |
| 15 | 9 | 116 | 200 | 39.5 | 21.3 | |
| 15 | 9 | 130 | 250 | 48.9 | 26.4 | |
| 10 | 1 | 116 | 200 | 7.76%/WT | 6.61 | Low Grams for higher % |
| 10 | 1 | 130 | 250 | 7.19%/WT | 6.18 | |

Oxygen flow 5.5 Litres per min. Power consumption 250 Watts

| Generator Temperature | Grams of Ozone per hour |
|---|---|
| 79 | 17.66 |
| 50 | 22.0 |
| 30 | 23.3 |

All readings were taken using a Reliant/Airsep AS15 Oxygen concentrator that gives approx 90% Oxygen.

It is envisioned that the ozone generator 10 may be used in a number of fluid purification apparatus including, without restriction, water purification apparatus and air purification apparatus. The ozone generator 10 is, however, equally suitable for other purification and/or sterilization systems where ozone production is desired including by way of non-limiting example, medical equipment sterilization apparatus.

Although the preferred embodiment of the invention describes the use of a liquid cooling system 16 including a refrigerant pump 26 and copper tube 24 as being used to cool the housing 14 during operation, the invention is not so limited. It is to be appreciated that other mechanisms for dissipating heat from the housing 14 are also possible and will now become readily apparent. Such mechanisms include, without restriction, the provision of metal or other thermally conductive heat sinks along part or all of the housing exterior, the provision of cooling fans, or the emersion of the housing 14 in a suitable cooling bath.

Although the preferred embodiment describes the flow passage 28 as including four e segments 44a,44b,44c,44d, the invention is not so limited. The flow passage 34 could be provided with a fewer or greater number of passage segments which extend either sinuously, non-linearly or in a labyrinthine fashion.

Although the detailed description describes and illustrates various preferred embodiments, the invention is not lo limited. Many modifications and variations will now occur to persons skilled in the art. For a definition of the invention, reference may be had to the appended claims.

We claim:

1. An apparatus for generating ozone and/or $O_1$ by the chemical conversion of an input oxygen containing gas comprising
a housing defining a cavity therein,
a fluid flow passage disposed in said cavity, said fluid flow passage being electrically insulated from said housing,
a plurality of electrodes disposed in said fluid flow passage, each of said electrodes comprising a folded or welded multipoint mesh metal sheet disposed in a plurality of substantially overlapping layers, said fluid flow passage comprising a generally serpentinely extending passage including a plurality of passage segments, each said passage segment having one of said electrodes disposed therein,
a power source for supplying an AC voltage, said power source including a contact lead electrically coupled to each said at least one electrode, and a ground lead in electrical contact with ground,
a gas inlet extending through said housing and for providing gaseous fluid communication with a first portion of said flow passage upstream from said electrode,
a gas outlet passage extending through said housing and providing gaseous fluid communication with a second portion of said flow passage spaced downstream from said electrodes.

2. The apparatus as claimed in claim 1 wherein said power source supplies said AC voltage as a generally square pulse high voltage waveform.

3. The apparatus as claimed in claim 2 wherein said apparatus is further operable to produce $O_1$, said power source including a high voltage supply generator and circuitry to supply said AC voltage at a frequency selected at about a third harmonic of the resonant frequency of said high voltage generator when electrically coupled to said at least one electrode.

4. The apparatus as claimed in claim 2 further including a cooling mechanism for supplying cooling fluid to at least part of said housing during operation of said apparatus, said cooling mechanism being selected to cool said housing to a temperature of between about 5° C. and 10° C.

5. The apparatus of claim 1 wherein said mesh sheet comprises a stainless steel mesh sheet.

6. The apparatus of claim 1 wherein said housing comprises a metal housing, and said ground lead is provided in electrical contact with said metal housing.

7. The apparatus as claimed in claim 1 wherein said passage segments are delineated from each other by a thermally conductive electrically insulating member spanning at least half way across a lateral width of said cavity.

8. The apparatus as claimed in claim 7 wherein said thermally conductive electrically insulating members comprise ceramic insulating members.

9. The apparatus as claim in claim 1 wherein the electrode in each said segment is spaced in the direction of said fluid flow passage from a next adjacent electrode.

10. The apparatus as claimed in claim 9 including an insulating spacer for electrically insulating said fluid flow passage from said housing.

11. The apparatus as claimed in claim 9 further comprising a fluid pump for supplying fluid into said fluid flow passage through said fluid inlet, said fluid pump selected to supply a predetermined volume of fluid to said fluid flow passage as a continuous batch process.

12. The apparatus as claimed in claim 11 wherein said fluid pump is selected to supply said fluid to said fluid flow passage at a flow rate of between about 1 and 10 liters/minute.

13. The apparatus of claim 1, wherein said fluid flow passage comprises a straight-line passage.

14. An apparatus for producing ozone and $O_1$
a metal housing defining a cavity therein,
a fluid flow passage disposed in said cavity, said fluid flow passage being electrically insulated from said housing,
a plurality of electrodes disposed in said fluid flow passage and being spaced in a direction of said flow passage from each other, each of said electrodes comprising a stainless steel mesh sheet which has been folded into at least three substantially overlapping layers, said fluid flow passage comprising a generally serpentinely extending passage comprising a plurality of passage segments, each passage segment having at least one of said electrodes disposed therein, and
wherein said passage segments are delineated from each other by an electrical insulator,
a generator element for producing a pulsed AC voltage including an electrical contact electrically coupled to each of said electrodes, and a ground electrode physically separated from said electrodes to form a gap therebetween,
a fluid inlet extending through said housing and providing gaseous fluid communication with an upstream end portion of said flow passage,
a fluid outlet passage extending through said housing and providing gaseous fluid communication with a downstream end portion of said flow passage spaced flow,
a fluid supply for supplying a fluid through said fluid inlet into said fluid passage and outwardly therefrom through said fluid outlet.

15. The apparatus as claimed in claim 14 further including a cooling mechanism for supplying cooling fluid to at least part of said housing during operation.

16. The apparatus as claimed in claim 14 wherein the electric insulator comprises a ceramic insulator.

17. The apparatus as claimed in claim 16 wherein the electrode in each said segment is spaced in the direction of fluid flow from a next adjacent electrode.

18. The apparatus as claimed in claim 14 wherein said fluid pump is selected to supply a predetermined volume of said fluid to said passage as a continuously process.

19. The apparatus as claimed in claim 14 wherein said fluid pump is selected to supply said fluid at a continuous flow rate of between about 1 and 10 liters/minute.

20. An apparatus for generating ozone comprising
a metal housing defining a cavity therein,
a generally serpentinely extending fluid flow passage disposed in said cavity, said fluid flow passage being electrically insulated from said housing and comprising a plurality of passage segments,
a metal mesh electrode selected from the group consisting of stainless steel mesh and platinum mesh disposed in each of said passage segments, said electrodes each comprising a mesh sheet which has been folded or spot welded into a plurality of substantially juxtaposed overlapping layers, and each of said passage segments are delineated from each other by an electrical insulator, a power source for supplying a pulsed voltage including a lead wire electrically coupled to each said at least one electrode, and a ground wire in electrical contact with said housing, a fluid inlet extending through said housing and providing gaseous fluid communication with a first portion of said flow passage upstream from said electrodes, a fluid outlet passage extending through said housing and providing gaseous fluid communication with a second portion of said flow passage spaced downstream from said electrodes, a fluid pump for supplying a fluid flow along said fluid flow passage from said fluid inlet to said fluid outlet.

21. The apparatus as claimed in claim 20 further including a cooling mechanism for cooling said housing during operation and said cooling mechanism is selected to cool a portion of said housing to a temperature of between about 5° C. and 12° C.

22. The apparatus as claimed in claim 21 wherein said fluid flow passage is electrically insulated from said housing by at least one pair of thermally conductive electrically insulating plates, each said plate being disposed along an opposite side of at least one flow passage segment on opposing sides of the electrode positioned therein, said cooling mechanism including a cooling fluid circulation tube in thermal contact with said pair of thermally conductive plates, whereby during operation said cooling mechanism effects cooling of both sides of the electrode positioned in said at least one flow passage segment.

23. The apparatus as claimed in claim 22 wherein said thermally conductive plates comprise ceramic plates.

24. The apparatus as claimed in claim 20 wherein said voltage is a pulsed AC voltage.

* * * * *

UNITED STATES PATENT AND TRADEMARK OFFICE
CERTIFICATE OF CORRECTION

| | | |
|---|---|---|
| PATENT NO. | : 7,943,098 B2 | Page 1 of 1 |
| APPLICATION NO. | : 10/589148 | |
| DATED | : May 17, 2011 | |
| INVENTOR(S) | : Stanley Phillips, Shirley Phillips and Andrew Phillips | |

It is certified that error appears in the above-identified patent and that said Letters Patent is hereby corrected as shown below:

column 11, line 29, "electrode" should read --electrodes--.
column 12, line 1, "fluid inlet" should read --gas inlet--.
column 12, line 9, "ozone and $O_1$" should be changed to --ozone and $O_1$ comprising--.
column 12, line 36, delete the text "spaced flow".
column 12, line 49, "pump" should be changed to --supply--.
column 12, line 52, "pump" should be changed to --supply--.
column 13, line 8, "fluid outlet passage" should read --fluid outlet--.

Signed and Sealed this
Ninth Day of August, 2011

David J. Kappos
*Director of the United States Patent and Trademark Office*